US006304398B1

(12) United States Patent
Gaub et al.

(10) Patent No.: US 6,304,398 B1
(45) Date of Patent: Oct. 16, 2001

(54) DUAL MODULO GRAY CODE POSITIONING SYSTEM

(75) Inventors: Stephen Matthew Gaub, Platteville, CO (US); Glen Worstell, Mustang, OK (US); Daniel Zaharris, Longmont, CO (US); Robert Dale Murphy, Boulder, CO (US); Michael Edward Baum; Rodney Brittner, both of Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/374,450

(22) Filed: Aug. 14, 1999

Related U.S. Application Data
(60) Provisional application No. 60/101,734, filed on Sep. 24, 1998.

(51) Int. Cl.[7] .................... G11B 5/09; G11B 5/596
(52) U.S. Cl. ................... 360/49; 360/48; 360/77.08
(58) Field of Search .................. 360/48, 49, 77.08

(56) References Cited

U.S. PATENT DOCUMENTS

| 4,556,960 | * 12/1985 | Cohn et al. ................. 711/218 |
| 5,003,412 | 3/1991 | Bizjak et al. ................. 360/77.01 |
| 5,119,248 | 6/1992 | Bizjak et al. ................. 360/75 |
| 5,459,623 | 10/1995 | Blagaila et al. ................. 360/77.08 |
| 5,526,202 | 6/1996 | Blagaila et al. ................. 360/77.08 |
| 5,737,142 | 4/1998 | Zook ................. 360/49 |
| 5,828,508 | 10/1998 | Whaley et al. ................. 360/49 |
| 5,847,894 | 12/1998 | Blank et al. ................. 360/77.01 |

* cited by examiner

*Primary Examiner*—Regina Y. Neal
(74) *Attorney, Agent, or Firm*—John R. Wahl; Merchant & Gould P.C.

(57) ABSTRACT

An apparatus and method of reducing the size of a servo burst and thus increasing the disc surface available for data storage is accomplished by uniquely encoding track information in the gray code of a servo burst on a disc. Each track has a unique sequential track identification number assigned to it. A plurality of sets of servo sectors on each track are encoded with a modulo operation of the track identification number for the track each using a unique modulus. Preferably the sectors are grouped into two sets, i.e., even numbered sectors on each track are modulo encoded with a first modulo operation of the track identification number for the track using a first modulus and odd numbered servo sectors on each track are modulo encoded with a second modulo operation of the track identification number for the track using a second modulus. Decoding the absolute track address is accomplished by decoding the modulo numbers and comparing the even sector modulo numbers to the odd numbered sector modulo numbers.

18 Claims, 10 Drawing Sheets

DUAL MODULO GRAY CODE POSITIONING SYSTEM

RELATED APPLICATIONS

This application claims the benefit of priority of United States Provisional Patent Application Serial No. 60/101,734, entitled "DUAL MODULO GRAY CODE POSITIONING SYSTEM", filed Sep. 24, 1998.

FIELD OF THE INVENTION

This application relates to magnetic disc drives and more particularly to a modulo gray code servo encoding system and method.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

The actuator arm is driven by a control signal fed to the voice coil motor (VCM) at the rear end of the actuator arm. A servo system is used to sense the position of the actuator and control the movement of the head above the disc using servo signals read from a disc surface in the disc drive. The servo system relies on servo information stored on the disc. The signals from this information generally indicate the present position of the head with respect to the disc, i.e., the current track position. The servo system uses the sensed information to maintain head position or determine how to optimally move the head to a new position centered above a desired track. The servo system then delivers a control signal to the VCM to rotate the actuator to position the head over a desired new track or maintain the position over the desired current track.

Servo information is typically stored in a disc drive in one of two ways: sectored servo and dedicated servo. In a sectored servo system, servo information is interspersed with user data on the disc surface. The servo information is stored in arcuate segments on each track of the disc surface. These segments are interspersed around the track between stored user data on the track. As the disc rotates beneath the head, the head periodically samples the servo sectors to obtain the servo information for the servo system. In a dedicated servo system, the servo information is stored on a separate dedicated disc surface which contains no user data. In this system, servo information is constantly available to the servo control system.

In a sectored servo system, the servo information that is recorded on a servo segment consists typically of a burst pattern. Table 1 below sets forth the fields of a typical set of servo segment dibits that make up the servo burst pattern in a servo segment. Table 2 breaks down, as an example, the prefix field dibits.

TABLE 1

| Description | AGC Preamble | AM | Prefix | Gray Code | Pad | A Burst | Pad | B Burst | Pad | C. Burst | Pad | D Burst | Pad |
|---|---|---|---|---|---|---|---|---|---|---|---|---|---|
| Length in Dibits | 20 | 8 | 9 | 16 | 2 | 8 | 2 | 8 | 2 | 8 | 2 | 8 | 2 |

TABLE 2

| | Bit | | | | | | | | |
|---|---|---|---|---|---|---|---|---|---|
| | 8 | 7 | 6 | 5 | 4 | 3 | 2 | 1 | 0 |
| Value | 1 | 1 | X | 1 | 1 | X | 1 | 0 | 1 |
| Description | AM Synch | | Index | | Guard Bit | Zap | Guard Bit | | |

The total number of dibits in a conventional servo field pattern is typically 95. This is made up of the automatic gain control block of 20 dibits, followed by an 8 dibit Address Mark and a 9-digit Prefix field. Currently the track number is identified by 16 bits of Gray code. The gray code is followed by four position bursts (A, B, C, D), each 8 bits long, separated by two dibit pads. Servo information represents system overhead that reduces the amount of user data that can be accommodated on the disc drive. It is thus desirable to minimize the disc surface real estate required for storage of servo information since storage capacity of as much user data as possible on the disc is generally desired.

SUMMARY OF THE INVENTION

Against this backdrop the present invention has been developed. The present invention is an apparatus and method of reducing the size of a servo burst and thus increasing the disc surface available for data storage. This is done by uniquely encoding track information in the Gray code of a servo burst on a disc which reduces the real estate utilized on the disc. Basically the method of the present invention is a method of reducing a servo burst length recorded on each of a plurality of sequentially numbered radial servo sectors spaced around the disc. The disc has concentric magnetic information storage tracks thereon. Each track has a unique sequential track identification number assigned to it. The method involves separating the sectors into at least two sets of sectors and modulo encoding each set of sectors with a modulo operation of the track identification number each using a unique modulus.

More preferably, the method includes separating the sectors into at least a first set of sectors and at least a second set of sectors. Next, the first set of sectors on each track is modulo encoded, i.e. subjected to a modulo operation of the track identification number using a first modulus. The second set is subjected to modulo encoding, i.e., performance of a modulo operation of the track identification number using a second modulus different from the first modulus. The modulo numbers are then converted to Gray code and written to the disc as part of the servo track writing process. The encoded and recorded modulo track ID numbers can be readily sensed and decoded in accordance with another aspect of the present invention.

Still more preferably, the sectors are divided into even numbered sectors and odd numbered sectors. The preferred method modulo encodes even numbered sectors on each track with a first modulo operation of the track identification number for the track using a first modulus and modulo encodes the odd numbered sectors on each track with a second modulo operation of the track identification number for the track using a second modulus. The modulo numbers are then converted to Gray code and then written as part of the servo burst to the disc.

These and various other features as well as advantages which characterize the present invention will be apparent from a reading of the following detailed description and a review of the associated drawings.

BRIEF DESCRIPTION OF THE DRAWINGS

FIGS. 10-1 and 10-2 are a gray zone crossing decode subroutine operation flow chart in accordance with a preferred embodiment of the invention.

DETAILED DESCRIPTION

Figure 1:
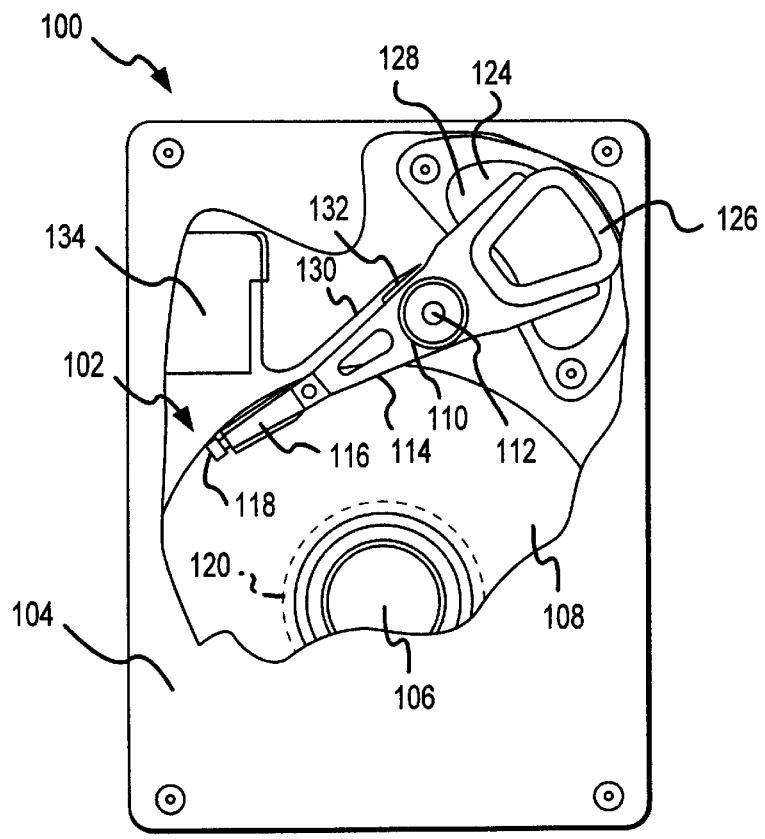
FIG. 1 is a schematic representation of a disc drive in accordance with a preferred embodiment of the invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
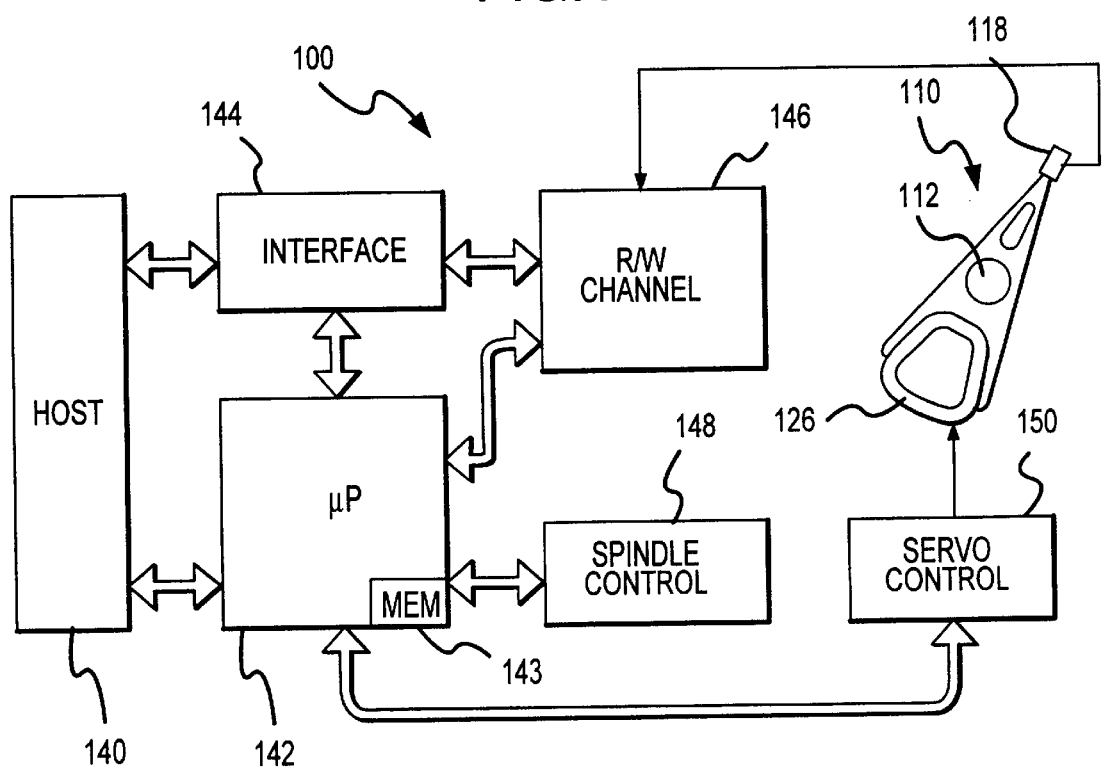
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

The discs 108 are rotated at a constant high speed by a spindle control circuit 148, which typically electrically commutates the spindle motor 106 (FIG. 1) through the use of back electromotive force (BEMF) sensing. The radial position of the heads 118 is controlled through the application of current to the coil 126 of the actuator assembly 110. A servo control circuit 150, a functional block diagram of which is provided in FIG. 3, provides such control.

Figure 3:
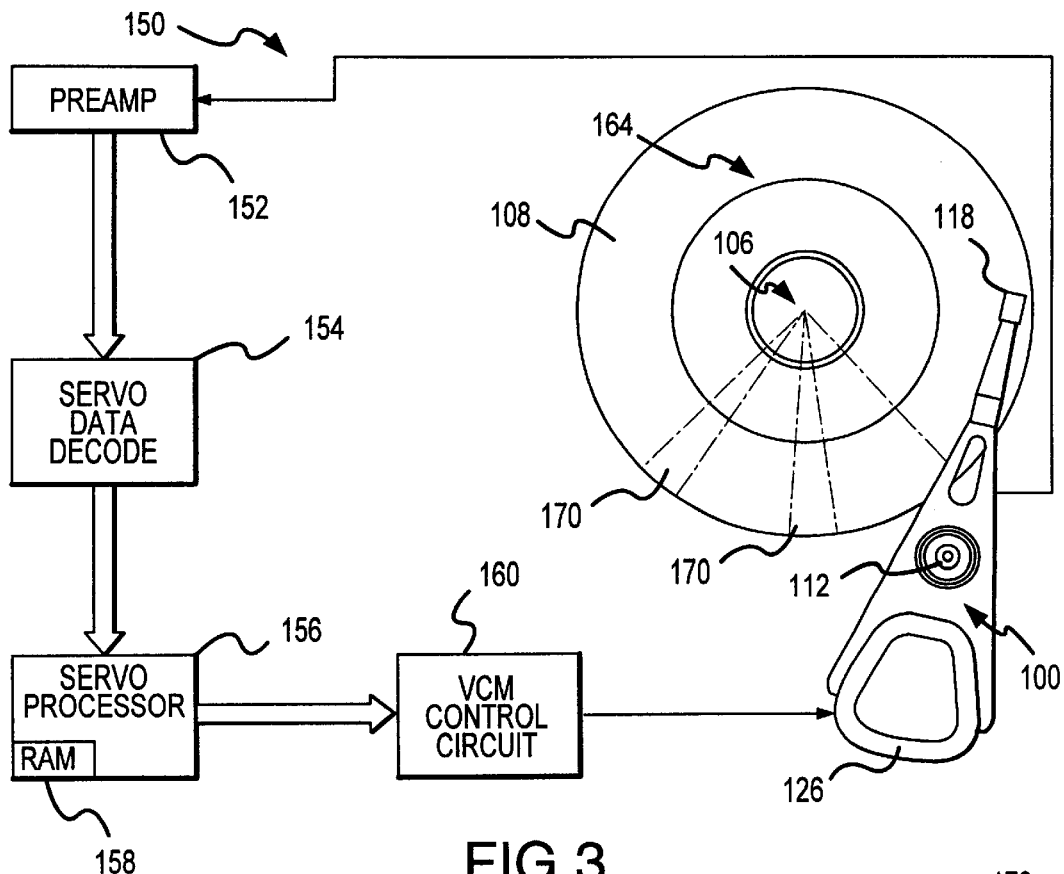
FIG. 3 shows an actuator control for the disc drive of FIG. 1.

Referring now to FIG. 3, the servo control circuit 150 includes a preamp circuit 152, a servo data and decode circuit 154, a servo processor 156 with associated servo RAM 158 and a VCM control circuit 160, all of which cooperate in a manner to be discussed in greater detail below to control the position of the head 118. For reference, the preamp circuit 152 is typically located on the printed circuit board 132 (FIG. 1) as it has been found to be generally advantageous to locate the preamp circuit 152 in close proximity to the heads 118.

It will be recognized that servo control generally includes two main types of operation: seeking and track following. A seek operation entails moving a selected head 118 from an initial track to a destination track on the associated disc surface through the initial acceleration and subsequent acceleration of the head 118 away from the initial track and towards the destination track. Once the head 118 is settled on the destination track, the disc drive enters a track following mode of operation wherein the head 118 is caused to follow the destination track until the next seek operation is to be performed. Such operations are well known in the art and are discussed, for example, in the previously referenced Duffy U.S. Pat. No. 5,262,907 as well as in U.S. Pat. No. 5,475,545 issued Dec. 12, 1995 to Hampshire et al. In order to better set forth the preferred embodiment of the present invention, however, the general operation of the servo control circuit 150 during track following will now briefly be discussed.

With continued reference to FIG. 3, analog burst signals are provided by the head 118 at such time that servo information associated with the track being followed passes under the head 118. The burst signals are amplified by the preamp circuit 152 and provided to the servo data decode circuit 154, which includes analog-to-digital converter (ADC) circuitry that converts the analog burst signals to digital form. The digitized signals are then provided to the servo processor 156, which in the preferred embodiment is a digital signal processor (DSP).

The servo processor 156 determines a position error signal (PES) from the relative magnitudes of the digital representations of the burst signals and, in accordance with commands received from the disc drive microprocessor 142 (FIG. 2), determines the desired position of the head 118 with respect to the track. It will be recognized that, generally, the optimal position for the head 118 with respect to the track being followed is over track center, but offsets (as a percentage of the width of the track) can sometimes be advantageously employed during, for example, error recovery routines. In response to the desired relative position of the head 118, the servo processor 156 outputs a current command signal to the VCM control circuit 160, which includes an actuator driver (not separately designated) that applies current of a selected magnitude and direction to the coil 126 in response to the current command signal. The disc drive 100 employs an embedded servo scheme which involves the interleaving of the servo information with user data on each track of the discs 108. The servo control circuit 150 thus generates estimates of head position, velocity and acceleration at such times that the head 118 is disposed over the user data portions of the track and uses these estimates to generate control signals to maintain the head 118 over the user data portions of the track.

Figure 4:
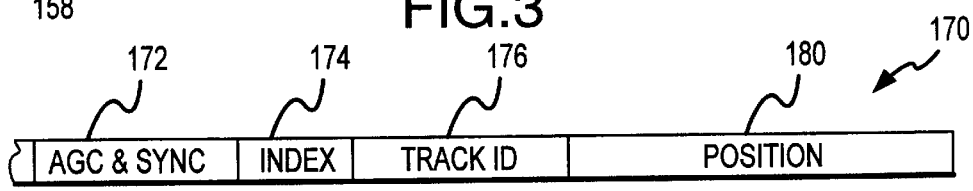
FIG. 4 is a representation of the content of a servo burst recorded on a typical sector on a disc.

The servo information on the discs 108 is recorded during the manufacturing of the disc drive 100 using a highly precise servo track writer. The servo information serves to define the boundaries of each of the tracks and is divided circumferentially into a number of sector frames, with user data portions disposed therebetween. The general format of a servo sector frame 170 is shown in FIG. 4 and comprises a plurality of fields, including an automatic gain control (AGC), Sync and Prefix field 172, an index field 174, a track identification (ID) (gray code) field 176 and a position field 180. Of particular interest is the track ID field 176 and the position field 180, but for purposes of clarity it will be recognized that the AGC & Sync field 172 provides input for the generation of timing signals used by the disc drive 100, the index field 174 indicates the beginning, i.e., the arcuate position of the track and the track ID field 176 provides the track address.

Figure 5:
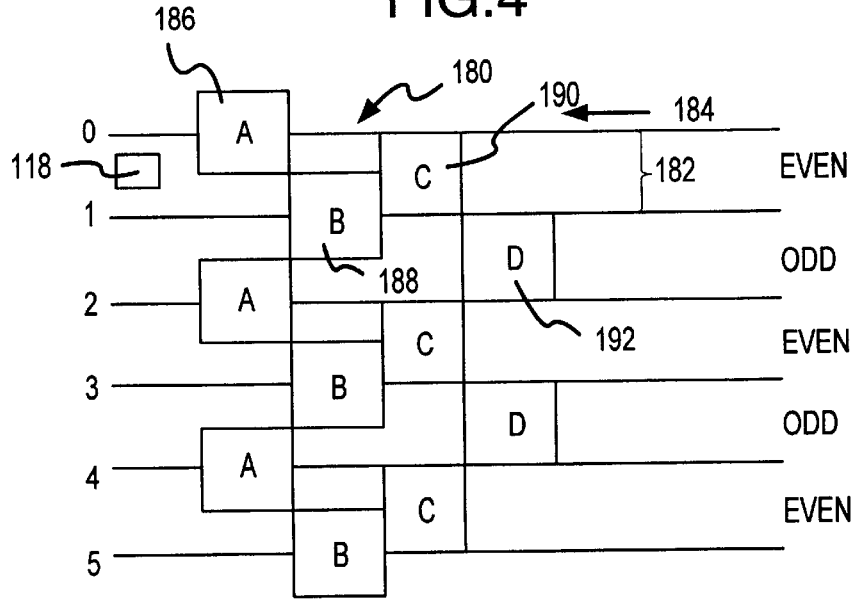
FIG. 5 is an enlarged representation of a servo burst pattern on a plurality of tracks.

The position field 180 comprises four position burst fields arranged in an offset, quadrature pattern for a plurality of adjacent concentric tracks, as shown in FIG. 5. More particularly, FIG. 5 shows the position field 180 to comprise burst patterns A, B, C and D having selected geometries and magnetization vectors, defining a plurality of track boundaries identified as 0–5. Thus, each track comprises the area bounded by two adjacent track boundaries. Additionally, the head 118 of FIG. 1 is represented in FIG. 5 as being centered on the track bounded by track boundaries 0 and 1 (with the particular track being identified as 182). The direction of rotation of the discs 108 (and hence movement of the the position field 180) relative to the head 118 is shown by arrow 184.

Both the A and B burst patterns are shown to extend from the center of one track (182), an even numbered track, to the center of an immediately adjacent track, each an odd numbered track, with these patterns offset as shown.

Additionally, the C and D burst patterns each extend from one track boundary to the next track boundary, with these patterns also offset as shown. Thus, as the head 118 passes over the position field 180 on track 182, the head will pass over portions of the A and B burst patterns (identified as 186 and 188, respectively) and then over C burst pattern 190. However, the head 118 will not encounter D burst pattern 192, as this pattern is on an adjacent track. For reference, tracks having C burst patterns are referred to as "even tracks" and tracks with D burst patterns are referred to as "odd tracks".

Generally, when the head 118 is centered at the mid-point of track 182, the amplitude of an A burst signal induced in the head 118 by the A burst pattern 186 will be nominally equal to the amplitude of a B burst signal induced in the head by the B burst pattern 188. Moreover, the amplitude of a C burst signal induced by the C burst pattern 190 will have a nominal maximum value and the amplitude of a D burst signal from the D burst pattern 192 will be nominally zero. Further, when the head 118 is positioned over the track boundary 1, the amplitudes of the C and D burst signals from the patterns 190 and 192 will be equal in magnitude, the B burst signal from the pattern 188 will have a maximum value and the A burst from the pattern 186 will be zero. Thus, as the head 118 is swept from one track boundary to the next, the amplitudes of the A, B, C and D burst signals cycle between zero and maximum values. The servo processor 156 (FIG. 3) utilizes the relative magnitudes of the burst signals in order to generate a position error signal (PES) and to adjust the amount of current applied to the coil 126 (FIG. 3).

The total length of the servo field in the disc drive in accordance with a preferred embodiment of the present invention is shorter than that of the conventional servo segment described above in the Background section of this specification. This reduction of total length is accomplished by first coding the track ID 176 gray code such that fewer bits are required to convey the track information needed for decoding the track address and second, reducing the length of the guard dibits bounding the position bursts A–D in the position section 180.

The presently preferred method specifically utilizes a dual modulo Gray code encoding of the track address information which reduces the length of the Gray code to 9 dibits as opposed to 16 dibits. In addition, the preferred scheme in accordance with a preferred embodiment of the present invention reduces the prefix field to 8 dibits rather than 9 dibits which together improves track format efficiency and substantially reduces the total length of the servo field to 75 dibits.

The dual modulo Gray code encoding of the track address in accordance with a preferred embodiment of the present invention is preferably 9 dibits in length with run length limits (rll) of 0=3 and 1=4. The even numbered servo sectors around the circumference of the discs on each track are written using modulo 256 and the odd numbered servo sectors are written using modulo 254. This arrangement results in about 21% less overhead per burst than is conventionally achievable. In addition, the position burst fields are each about 30% shorter, which results in fewer defects occurring and therefore an improvement in position burst accuracy of about 30%. Finally, since the gray code and prefix fields are shorter, fewer gray code errors are expected and thus accuracy should improve by about 44%.

In the gray code encoding method of the present invention for track ID section 176, the inner guard bands are written with valid codes starting with the last data spare track. The outer guard bands are written from the outer crash stop and end such that the first data track is in band number 1. An exemplary set of the band numbers and their modulo gray codes is provided below in Table 3.

TABLE 3

| Band | Even Sector Gray Code (mod 256) | Odd Sector Gray Code (mod 254) | Phase | Cylinder |
|---|---|---|---|---|
| 0 | 0 | 0 | 0 | 0 |
| 1 | 1 | 1 | 0 | 0.666666667 |
| 2 | 2 | 2 | 0 | 1.333333333 |
| 3 | 3 | 3 | 0 | 2 |
| 4 | 4 | 4 | 0 | 2.666666667 |
| . | . | . | . | . |
| . | . | . | . | . |
| . | . | . | . | . |
| 250 | 250 | 250 | 0 | 166.6666667 |
| 251 | 251 | 251 | 0 | 167.3333333 |
| 252 | 252 | 252 | 0 | 168 |
| 253 | 253 | 253 | 0 | 168.6666667 |
| 254 | 254 | 0 | 0 | 169.3333333 |
| 255 | 255 | 1 | 0 | 170 |
| 256 | 0 | 2 | 2 | 170.6666667 |
| 257 | 1 | 3 | 2 | 171.3333333 |
| 258 | 2 | 4 | 2 | 172 |
| 259 | 3 | 5 | 2 | 172.6666667 |
| . | . | . | . | . |
| . | . | . | . | . |
| 506 | 250 | 252 | 2 | 337.3333333 |
| 507 | 251 | 253 | 2 | 338 |
| 508 | 252 | 0 | 2 | 338.6666667 |
| 509 | 253 | 1 | 2 | 339.3333333 |
| 510 | 254 | 2 | 2 | 340 |
| 511 | 255 | 3 | 2 | 340.6666667 |
| 512 | 0 | 4 | 4 | 341.3333333 |
| 513 | 1 | 5 | 4 | 342 |
| 514 | 2 | 6 | 4 | 342.6666667 |
| 515 | 3 | 7 | 4 | 343.3333333 |
| . | . | . | . | . |
| . | . | . | . | . |
| 759 | 247 | 251 | 4 | 506 |
| 760 | 248 | 252 | 4 | 506.6666667 |
| 761 | 249 | 253 | 4 | 507.3333333 |
| 762 | 250 | 0 | 4 | 508 |
| 763 | 251 | 1 | 4 | 508.6666667 |
| 764 | 252 | 2 | 4 | 509.3333333 |
| 765 | 253 | 3 | 4 | 510 |
| 766 | 254 | 4 | 4 | 510.6666667 |
| 767 | 255 | 5 | 4 | 511.3333333 |
| 768 | 0 | 6 | 6 | 512 |
| 769 | 1 | 7 | 6 | 512.6666667 |
| 770 | 2 | 8 | 6 | 513.3333333 |
| 771 | 3 | 9 | 6 | 514 |
| . | . | . | . | . |
| . | . | . | . | . |
| 1013 | 245 | 251 | 6 | 675.3333333 |
| 1014 | 246 | 252 | 6 | 676 |
| 1015 | 247 | 253 | 6 | 676.6666667 |
| 1016 | 248 | 0 | 6 | 677.3333333 |
| 1017 | 249 | 1 | 6 | 678 |
| 1018 | 250 | 2 | 6 | 678.6666667 |
| 1019 | 251 | 3 | 6 | 679.3333333 |
| 1020 | 252 | 4 | 6 | 680 |
| 1021 | 253 | 5 | 6 | 680.6666667 |
| 1022 | 254 | 6 | 6 | 681.3333333 |
| 1023 | 255 | 7 | 6 | 682 |
| 1024 | 0 | 8 | 8 | 682.6666667 |
| 1025 | 1 | 9 | 8 | 683.3333333 |
| 1026 | 2 | 10 | 8 | 684 |
| . | . | . | . | . |
| . | . | . | . | . |
| 1266 | 242 | 250 | 8 | 844 |
| 1267 | 243 | 251 | 8 | 844.6666667 |
| 1268 | 244 | 252 | 8 | 845.3333333 |

TABLE 3-continued

| Band | Even Sector Gray Code (mod 256) | Odd Sector Gray Code (mod 254) | Phase | Cylinder |
|---|---|---|---|---|
| 1269 | 245 | 253 | 8 | 846 |
| 1270 | 246 | 0 | 8 | 846.6666667 |
| 1271 | 247 | 1 | 8 | 847.3333333 |
| 1272 | 248 | 2 | 8 | 848 |
| 1273 | 249 | 3 | 8 | 848.6666667 |
| 1274 | 250 | 4 | 8 | 849.3333333 |
| 1275 | 251 | 5 | 8 | 850 |
| 1276 | 252 | 6 | 8 | 850.6666667 |
| 1277 | 253 | 7 | 8 | 851.3333333 |
| 1278 | 254 | 8 | 8 | 852 |
| 1279 | 255 | 9 | 8 | 852.6666667 |
| 1280 | 0 | 10 | 10 | 853.3333333 |
| 1281 | 1 | 11 | 10 | 854 |
| 1282 | 2 | 12 | 10 | 854.6666667 |
| 1283 | 3 | 13 | 10 | 855.3333333 |
| . | . | . | . | . |
| . | . | . | . | . |
| . | . | . | . | . |
| 1521 | 241 | 251 | 10 | 1014 |
| 1522 | 242 | 252 | 10 | 1014.666667 |
| 1523 | 243 | 253 | 10 | 1015.333333 |
| 1524 | 244 | 0 | 10 | 1016 |
| 1525 | 245 | 1 | 10 | 1016.666667 |
| 1526 | 246 | 2 | 10 | 1017.333333 |
| 1527 | 247 | 3 | 10 | 1018 |
| 1528 | 248 | 4 | 10 | 1018.666667 |
| 1529 | 249 | 5 | 10 | 1019.333333 |
| 1530 | 250 | 6 | 10 | 1020 |
| 1531 | 251 | 7 | 10 | 1020.666667 |
| 1532 | 252 | 8 | 10 | 1021.333333 |
| 1533 | 253 | 9 | 10 | 1022 |
| 1534 | 254 | 10 | 10 | 1022.666667 |
| 1535 | 255 | 11 | 10 | 1023.333333 |
| 1536 | 0 | 12 | 12 | 1024 |
| 1537 | 1 | 13 | 12 | 1024.666667 |
| 1538 | 2 | 14 | 12 | 1025.333333 |
| etc | etc. | etc. | etc. | etc. |

Figure 12:
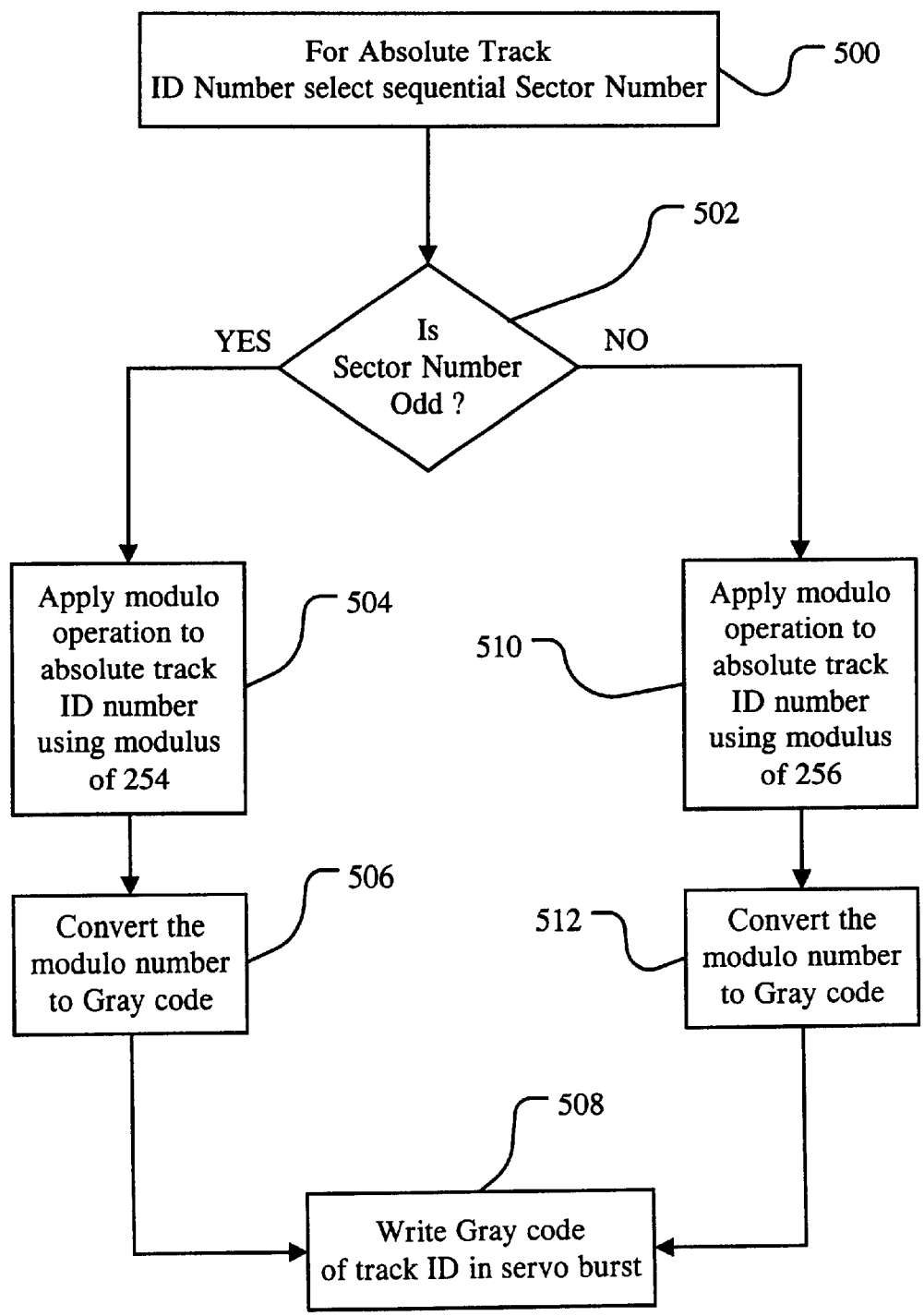
FIG. 12 is an operation flow chart of the track identification number encoding scheme in accordance with a preferred embodiment of the present invention.

FIG. 12 shows a flow diagram of the encoding scheme in accordance with the preferred embodiment of the present invention. This process is done preferably in the servo track writer. Most of the track writer software is conventional and therefore will not be discussed in this specification. In operation 500, the absolute track identification number, or Track ID, is ascertained and a sequential servo sector number for the burst to be written is determined. Control then transfers to query operation 502 where the question is asked whether the servo number is odd. Note here that the query here could be reversed, i.e., whether the servo number is even. The sequence shown in FIG. 12 thus is only exemplary. If the answer in operation 502 is yes, control transfers to operation 504. Operation 504 involves applying a modulo operation to the track ID number using a modulus of 254, yielding a modulo number as shown in Table 3. Control then transfers to operation 506 where the modulo number just determined is converted to a Gray code value, as in Table 4. Control then transfers to operation 508 in which the Gray code encoded modulo number for the track ID is written to the servo burst on the disc in the servo track writing operation (not shown).

Returning now to operation 502, if the answer was no, i.e., the sector number is an even number, control transfers to operation 510 in which a modulo operation is applied to the absolute track ID number using a modulus of 256 to generate the modulo number. Control then transfers to operation 512, where the modulo number arrived at in operation 510 is converted to Gray code as in Table 4. Control then transfers to operation 508 where the Gray code encoded modulo number is written to the disc as the track ID in the servo burst. Operations 500 through 512 are repeated to arrive at each encoded track ID for each servo burst being written by the servo track writer operation.

Table 4 below is the actual gray code (9 bit with rll limits of 0=3 and 1=4) encode table for the dual modulo system in accordance with a preferred embodiment of the present invention. The odd number tracks or bands are modulo 254 coded from 1C4 to 1E4 and the even number tracks or bands are modulo 256, coded from 1C4 to 1C5, both in accordance with the Table 3 set forth below. Note that the encode gray code table below can be used for both even and odd servo sectors because the entries in table incorporate a hamming distance of 1 from the last entry (position 255=$1C5) to the first entry (0=$1C4) and from the third from last entry (position 253=$1E4) to the first entry (0=$1C4).

TABLE 4

| | | | | | | | | | |
|---|---|---|---|---|---|---|---|---|---|
| 0 = $1C4 | 26 = $AA | 52 = $9C | 78 = $56 | 104 = $33 | 130 = $4D | 156 = $129 | 182 = $176 | 208 = $113 | 234 = $1B5 |
| 1 = $1CC | 27 = $AB | 53 = $94 | 79 = $52 | 105 = $31 | 131 = $49 | 157 = $12D | 183 = $172 | 209 = $111 | 235 = $1A5 |
| 2 = $1CD | 28 = $A9 | 54 = $96 | 80 = $53 | 106 = $35 | 132 = $4B | 158 = $12C | 184 = $173 | 210 = $115 | 236 = $1A4 |
| 3 = $1C9 | 39 = $AD | 55 = $92 | 81 = $51 | 107 = $25 | 133 = $4A | 159 = $12E | 185 = $171 | 211 = $195 | 237 = $1A6 |
| 4 = $1CB | 30 = $AC | 56 = $93 | 82 = $55 | 108 = $24 | 134 = $48 | 160 = $126 | 186 = $175 | 212 = $191 | 238 = $1AE |
| 5 = $1CA | 31 = $AE | 57 = $91 | 83 = $75 | 109 = $26 | 135 = $148 | 161 = $124 | 187 = $155 | 213 = $193 | 239 = $1AC |
| 6 = $1C8 | 32 = $A6 | 58 = $95 | 84 = $71 | 110 = $2E | 136 = $14A | 162 = $125 | 188 = $151 | 214 = $192 | 240 = $1AD |
| 7 = $C8 | 33 = $A4 | 59 = $D5 | 85 = $73 | 111 = $2C | 137 = $14B | 163 = $135 | 189 = $153 | 215 = $196 | 241 = $1A9 |
| 8 = $CA | 34 = $A5 | 60 = $D1 | 86 = $72 | 112 = $2D | 138 = $149 | 164 = $131 | 190 = $152 | 216 = $194 | 242 = $1AB |
| 9 = $CB | 35 = $B5 | 61 = $D3 | 87 = $76 | 113 = $29 | 139 = $14D | 165 = $133 | 191 = $156 | 217 = $19C | 243 = $1AA |
| 10 = $C9 | 36 = $B1 | 62 = $D2 | 88 = $74 | 114 = $2B | 140 = $14C | 166 = $132 | 192 = $154 | 218 = $19D | 245 = $1A8 |
| 11 = $CD | 37 = $B3 | 63 = $D6 | 89 = $7C | 115 = $2A | 141 = $14E | 167 = $136 | 193 = $15C | 219 = $199 | 246 = $1E8 |
| 12 = $CC | 38 = $B2 | 64 = $D4 | 90 = $7D | 116 = $28 | 142 = $146 | 168 = $134 | 194 = $15D | 220 = $19B | 247 = $1EA |
| 13 = $C4 | 39 = $B6 | 65 = $DC | 91 = $79 | 117 = $68 | 143 = $144 | 169 = $13C | 195 = $159 | 221 = $19A | 248 = $1EB |
| 14 = $C5 | 40 = $B4 | 66 = $DD | 92 = $7B | 118 = $6A | 144 = $145 | 170 = $13D | 196 = $15B | 222 = $198 | 249 = $1E9 |
| 15 = $E5 | 41 = BC$ | 67 = $D9 | 93 = $7A | 119 = $6B | 145 = $165 | 171 = $139 | 197 = $15A | 223 = $1B8 | 250 = $1ED |
| 16 = $E4 | 42 = $BD | 68 = $DB | 94 = $78 | 120 = $69 | 146 = $164 | 172 = $13B | 198 = $158 | 224 = $1BA | 251 = $1EC |

TABLE 4-continued

| | | | | | | | | | |
|---|---|---|---|---|---|---|---|---|---|
| 17 = $E6 | 43 = $B9 | 69 = $DA | 95 = $38 | 121 = $6D | 147 = $16C | 173 = $13A | 199 = $118 | 225 = $1BB | 252 = $1EE |
| 18 = $EE | 44 = $BB | 70 = $D8 | 96 = $3A | 122 = $6C | 148 = $16D | 174 = $138 | 200 = $11A | 226 = $1B9 | 253 = $1E6 |
| 19 = $EC | 45 = $BA | 71 = $58 | 97 = $3B | 123 = $64 | 149 = $169 | 175 = $178 | 201 = $11B | 227 = $1BD | 254 = $1E4 |
| 20 = $ED | 46 = $B8 | 72 = $5A | 98 = $39 | 124 = $65 | 150 = $16B | 176 = $17A | 202 = $119 | 228 = $1BC | 255 = $1E5 |
| 21 = $E9 | 47 = $98 | 73 = $5B | 99 = $3D | 125 = $45 | 151 = $16A | 177 = $17B | 203 = $11D | 229 = $1B4 | 256 = $1C5 |
| 22 = $EB | 48 = $9A | 74 = $59 | 100 = $3C | 126 = $44 | 152 = $168 | 178 = $179 | 204 = $11C | 230 = $1B6 | |
| 23 = $EA | 49 = $9B | 75 = $5D | 101 = $34 | 127 = $46 | 153 = $128 | 179 = $17D | 205 = $114 | 231 = $1B2 | |
| 24 = $E8 | 50 = $99 | 76 = $5C | 102 = $36 | 128 = $4E | 154 = $12A | 180 = $17C | 206 = $116 | 232 = $1B3 | |
| 25 = $A8 | 51 = $9D | 77 = $54 | 103 = $32 | 129 = $4C | 155 = $12B | 181 = $174 | 207 = $112 | 233 = $1B1 | |

One primary advantage of utilizing a dual modulo gray code encoding scheme is that a recalibration operation can be performed on any band on the disc surface, and thus can be determined at any time. With dual modulo gray code the absolute position of the head 118 can be decoded as follows, from the decoded gray code information:

if GCODD<GCEVEN then Temp+GCODD+256 else Temp+GCOOD;     (1)

$T=((Temp-GCEVEN) mod 254)*127+GCODD$.
where

T=Band Number

GCEVEN=decoded gray code value for even numbered servo sector

GCODD=decoded gray code value for odd numbered servo sector

Note that when the head 118 is on track in track following mode GCEVEN+GCODD is always an even number. This can be used as a check on the decode value validity. This absolute decode method implies that both the GCEVEN and GCODD are from the same track so the velocity of the head moving across the tracks or bands must be less than ½ track per sector.

The servo sector arrangement in accordance with a preferred embodiment of the present invention is shown in Table 5 below.

TABLE 5

| Description | AGC Preamble | AM | Prefix | Gray Code | Pad | A Burst | Pad | B Burst | Pad | C. Burst | Pad | D Burst | Pad |
|---|---|---|---|---|---|---|---|---|---|---|---|---|---|
| Length in Dibits | 20 | 8 | 8 | 9 | 2 | 6 | 1 | 6 | 1 | 6 | 1 | 6 | 1 |

NEW SERVO FIELD PATTERN

As previously discussed, there are four burst patterns, labeled A, B, C, and D or 186, 188, 190, and 192 respectively in the servo position burst 180 in each servo segment frame 170 in FIG. 5 following the gray code track ID field 176. Each of the position burst patterns is 6 dibits long and is separated by a "pad" of one dibit in the coding in accordance with a preferred embodiment of the present invention. The reduction of the position burst patterns still permits acceptable position error signal accuracy and the reduction in the pads is permissible because of current improved preamplifier read/write time and accuracy. The index or Address Mark (AM) field 174 in the present invention utilizes 8 dibits for the address mark and 8 dibits for the Prefix field. The track ID or gray code field 176 is 9 dibits long. As in the conventional system, the Automatic Gain Control (AGC) Sync and AGC Preamble burst 172 is 20 dibits in length. The prefix field is shown in Table 6 below.

TABLE 6

| | Bit | | | | | | | |
|---|---|---|---|---|---|---|---|---|
| | 7 | 6 | 5 | 4 | 3 | 2 | 1 | 0 |
| Value | 1 | 1 | X | 1 | X | X | 0 | 1 |
| Description | AM Sync | | Index | Guard Bit | Zap | ID Guard Bit | | |

NEW PREFIX FIELD

The new prefix field is 8 bits instead of nine and includes a negative true bit as the inner guard band bit (IDGB bit 2). This IDGB bit 2 is used as the indicator of actuator position during the actuator unlatch routine described briefly below.

There are four basic decode modes of operation for identifying the band number from the coded gray codes. These are the "Absolute Decode option", the "Look up Table option", the "Gray Zone Crossing option", and the "Gray Zone option", shown in FIGS. 7–11 and described in more detail below. The Absolute Decode option is generally used during recalibration and arrival verification during the track-follow-settle state, described below. This state requires the radial velocity of the actuator 110 to be <(bands/x)/sector, where x is the number of consecutive band decodes that have the same value. The Look-Up Table option is used during the track follow state because the gray codes (for odd and even sectors) may not be from the same track for any given pair of servo sectors while using a 3/2 quad positioning scheme. The Gray Zone crossing option is used during velocity mode seeks and the velocity is less than the modulo number of bands (i.e. 256 or 254) per sector. During all other actuator states, except recalibration, the Gray Zone Option is used provided the velocity is less than half the modulo number of bands (i.e. 127 or 126) per sector, Table 7 provides a summary list of the gray code conversion option used for each actuator state. The actuator states pertinent to the preferred embodiment are shown in FIG. 6 and are described in detail as follows.

TABLE 7

| Actuator State | Gray Code Conversion Mode | Comment |
| --- | --- | --- |
| Start Seek | Gray Zone | |
| Start Move | Gray Zone | |
| VM Constant Accel | Gray Zone Xings | |
| VM Square Root | Gray Zone Xings | |
| VM Linear | Gray Zone | |
| PM Accel Ka | Gray Zone | |
| PM Accel | Gray Zone | |
| PM Decel | Gray Zone | |
| Velocity Kill Init | Depends on origin of entry | No Change to Decode Mode control |
| Velocity Kill | Depends on origin of entry | No Change to Decode Mode control |
| Bias In | Depends on origin of entry | No Change to Decode Mode control |
| Recov Seek Init | Gray Zone with Even Sectors Only | |
| Recal Init | Gray Zone with Even Sectors Only | |
| Recal | Gray Zone with Even Sectors Only | Uses Absolute Decode for Recalibrated Position |
| Recov Seek | Gray Zone Xings | Switches to Gray Zone at Position Threshold |
| Prime TF Settle | Gray Zone | |
| Track Follow Settle | Gray Zone | |
| Track Follow | Look Up Table | |
| Track Follow Trans | Gray Zone | |
| VCMIKill | Depends on origin of entry | No Change to Decode Mode control |
| TF TO Recov Init | Gray Zone | |
| Unlatch Init | Gray Zone with Even Sectors Only | |
| Unlatch | Gray Zone with Even Sectors Only | |

Figure 6:
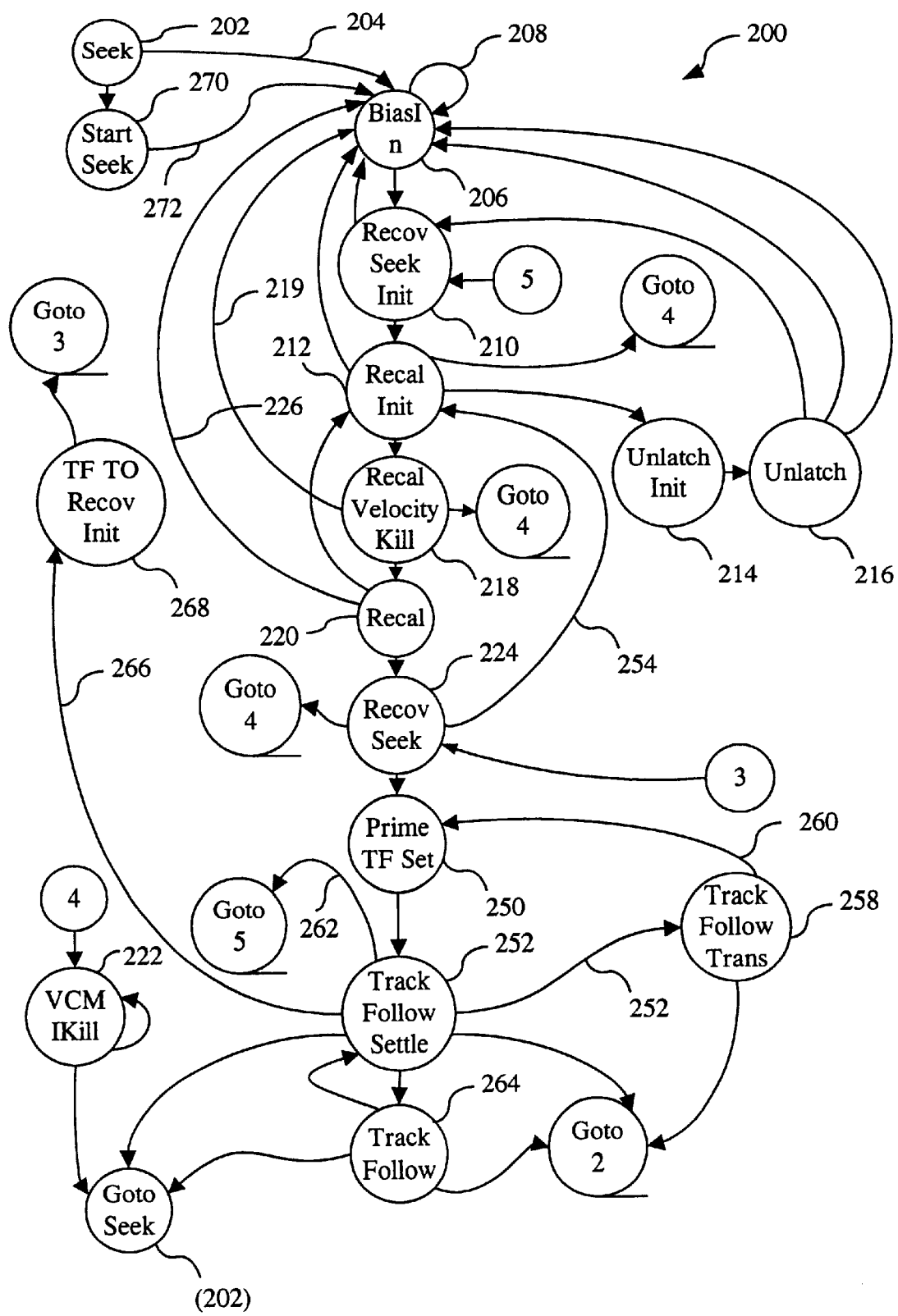
FIG. 6 is a partial state diagram for a disc drive actuator utilizing dual modulo gray code encoding in accordance with a preferred embodiment of the invention.

The state diagram 200 for the disc drive actuator control system in accordance with the invention is shown in FIG. 6. When the disc drive 100 is started up, a seek command is issued in state operation 202. None of the decode modes may be used when the actuator 110 is at the latch position because the control system cannot be calibrated due to the fact that gray codes for any two consecutive bursts may not be from the same track. Therefore, the IDGB bit in the Prefix section of the servo burst is used as feedback signal to unlatch the actuator. After unlatching the actuator, the actuator control state is advanced to the modulo gray code recalibration state.

Specifically, since the disc spin motor is initially accelerating and thus not up to speed at startup, there is a spin error and control initially transfers via line 204 to the BiasIn state or operation 206. Control then continually loops within operation 206 via line 208 until the spin motor is up to speed and thus there is no spin error signal.

When the spin error signal clears, i.e., the spin motor 106 is up to speed, good Address Mark and Gray code information is detected and the IDGB is set to true, the spin error counter is reset to a default value and control then transfers to a Recovery Seek Initialization state 210. In this state 210, the Recovery Seek registers are initialized. Control then transfers to Recalibration Initialization state 212.

The Recalibration Initialization state 212 is designed to sense whether the inside diameter guard band bit is set and ascertain when actuator arm radial velocity is reduced after unlatching. In the Recalibration Initialization state 212, if the IDGB bit is set, i.e., indicating that the actuator heads 118 are over the inside guard band or in park position, control transfers to Unlatch Initialization state 214. When the Unlatch Initialization operation is complete, control transfers to Unlatch operation 214. When the actuator 110 is unlatched, the IDGB bit is reset, and control then transfers back through the BiasIn operation 206, through the Recovery Seek Initialization state 210, through the Recalibration Initialization state 212 where, if the actuator assembly velocity is much less than the modulo speed limit (even modulo/2 is the limit), then control transfers to a Recal Velocity Kill state 218.

Figure 7:
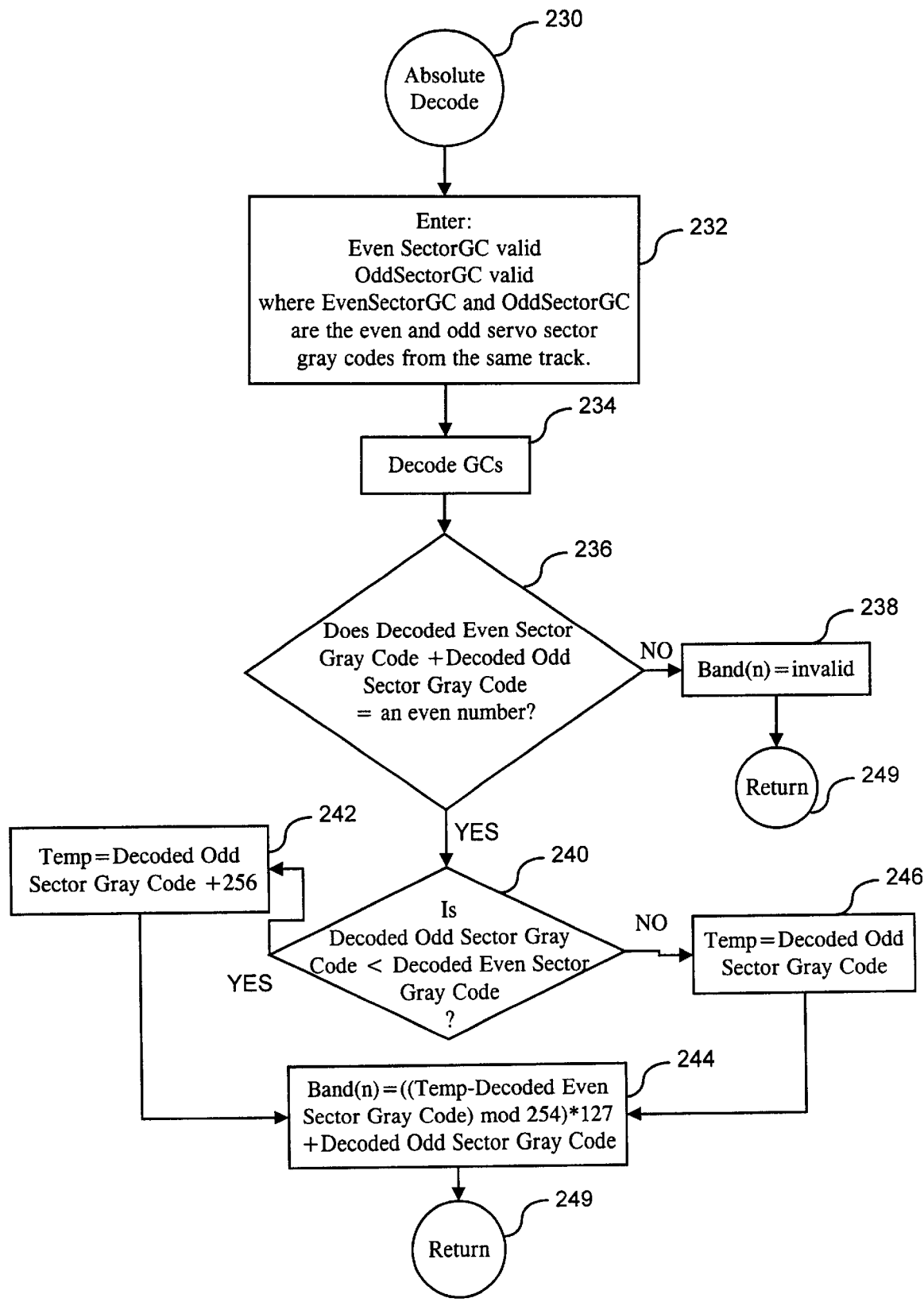
FIG. 7 is an absolute track identification decode subroutine operation flow chart in accordance with a preferred embodiment of the invention.

The Recal Velocity Kill state 218 either transfers control on a time out to VCM Ikill state 221 where the current to the VCM 124 is stopped, transfers control to Recal state 220 if velocity of the actuator 110 becomes less than or equal to 4 bands per 2 sector samples, for three consecutive samples, or transfers control back to BiasIn state 206 on sensed spin error via line 219. The Recal Velocity Kill state uses BEMF (back EMF) control or BEMF braking followed by feedback from either odd or even servo sector at half the normal sample rate. During Recal state 220, the absolute decode option subroutine shown in FIG. 7 is followed to determine the decoded band ID. This subroutine is described in further detail below.

At this point in the description, it should be noted that, in general, when the system is in any state, control will transfer back to the BiasIn state 206 until such time as spin error is within acceptable limits, i.e. spin error signal is cleared. In addition, control will transfer back to BiasIn state 206 if a time out occurs or too many servo defects are detected. These conditions are reflected in lines If the IDGB bit is sensed as not set in state 212, this tells the control system that the actuator heads 118 are no longer in the park position. In this case, control transfers from state 212 to the Recalibration Velocity kill state 218 provided the actuator radial velocity is much less than the modulo speed limit (modulo/2, i.e. 256/2 or 127, for example). However, if spin error is again detected, i.e., if the spin motor is not at the required speed, for whatever reason, then control transfers via line 219 back to the BiasIn state 206. If, while in the Recalibration Velocity kill state 218, actuator velocity is sensed to drop to less than or equal to 4 bands per 2 sector samples, control transfers to the Recalibration state 220. If a time out condition is reached, without the actuator velocity slowing to less than or equal to 4 bands per two sector samples, then control transfers to a VCM Ikill operation 222 where the actuator current is reduced to zero is and control simply awaits another seek command. In the Recal state, the absolute decode option 230 is utilized. Control remains in Recalibration state 220 until a condition in which three consecutive absolute decoded band numbers are equal.

When this is achieved, control then transfers to Recovery Seek state 224.

Referring specifically to FIG. 7, the absolute decode option 230 is shown in detail. The absolute decode option is utilized to determine the current head position when the head velocity is much less than ½ band per sample. The absolute decode option method 230 retrieves an odd and even servo sector gray code from the same track or band. The absolute band number can then be decoded as described in equation (1) above. Absolute decoding is used for re calibration and as arrival verification during track-follow-settle. First, a valid even sector gray code (EvenSectorGC) value is sensed from the track ID gray code and a valid odd sector gray code (OddSectorGC) value is sensed for the same track in operation 232. These two gray codes are then decoded in operation 234. As a check on the detected gray codes, the query is made in operation 236 whether the decoded even sector gray code+the decoded odd sector gray code equals an even number. If the answer to this query is no, control transfers to operation 238 where the detected band number is deemed invalid and control then returns via operation 249 to its starting point to await receipt of another pair of odd and even sector gray codes. If, on the other hand, the answer in operation 236 is yes, control transfers to another query 240 which asks whether the decoded odd sector gray code , decoded even sector gray code.

If the answer to query 240 is yes, then control transfers to operation 242 where the number 256 is added to the decoded odd sector gray code to form a number "Temp". Control then passes to operation 244 where the Band(n) is calculated according to Band(n)=((Temp-Decoded Even Sector gray Code) mod 254)*127+Decoded Odd Sector Gray Code . If the answer to query 240 is no, then control passes to operation 246 where the Temp value is determined to be equal to the decoded Odd Sector Gray Code value. Control then transfers to operation 244 where the Band(n) is again calculated as Band(n)=((Temp-Decoded Even Sector gray Code) mod 254)*127+Decoded Odd Sector Gray Code . Control then transfers back to the state calling the absolute decode routine 230 via operation 249, such as the Recal state 220.

In Recal state 220, if spin error or time out signals are detected, control transfers via line 226 back to BiasIn state 206. Alternatively, if three consecutive band number values, detected via absolute decode option 230, are equal, control transfers from Recal state 220 to the Recovery seek state 224.

In Recovery Seek state 224, control ascertains whether the target track or band has been reached. If so, control transfers to Prime Track Follow (TF) Set state 250. If not, control ascertains whether an overshoot has exceeded the decode range or whether the decoded gray code was invalid If so, control transfers via line 254 back to Recalibration Initialization state 212. If none of these conditions is met and a settle time out is sensed with the target found, control transfers again to the VCM Ikill state 222.

In the Prime TF Set state 250, the track follow settle subroutine is initialized, and then control transfers to Track-Follow-Settle state 252. Here, control ascertains whether settle criteria are met and the absolute decode values are verified, i.e., Target=Actual Absolute Decode value per FIG. 7) and whether the trans cal flag is set. If the trans cal flag is set, control transfers via line 256 to Track Follow Trans state 258. Here the position error signal (PES) normalization values are calculated and then control transfers back to Prime TF Set 250 via line 260 if/when the transducer calibration is completed and then back to Track Follow Settle state 252.

If, in state 252, the settle threshold is exceeded or settle time out without target found is sensed, then control transfers via line 262 back to Recovery Seek Initialization state 210. If the trans cal flag is not set, when control passes to Track Follow Settle state 252, and if the settle criteria are met and absolute decode is verified, then control transfers to Track Follow state 264. If, in Track Follow Settle state 252, settle timeout is indicated with target found, control transfers via line 266 to Track Follow To Recovery Initialization state 268 where a recovery seek is initialized. When this is complete, control transfers back to Recovery Seek state 224. On the other hand, if none of the above conditions are met in state 252, control then transfers back to the Seek state 202 awaiting a new seek command.

In state 264, control remains in Track Follow unless position threshold exceeded or three servo defects are encountered or spin error is detected, or another seek request is introduced, in which case control transfers back to Seek state 202.

Referring back to FIG. 6, when a seek is required and there is no spin error or servo defects, control transfers to the Start Seek state 270. If spin error is detected or if too may servo defects are detected, control transfers via line 272 back to BiasIn state 206 previously described. If no spin error or no unacceptable servo defects are detected, then control passes through either a position mode control loop to move the actuator short distances or a velocity mode loop if a large actuator movement is required to reach the desired band. When the desired band is approached control transfers, in either control loop, back to Prime Track Follow Set state 250 shown in FIG. 6. Control then proceeds through track Follow Settle and Track Follow states 252 and 264 again as previously described for the new track or band.

During track following, the lookup table decode subroutine 280 is utilized to determine the track or band ID. This subroutine is used because the gray codes for odd and even sectors may not be from the same track for any given pair of servo sectors, since a 3/2 quad positioning scheme is preferably used. Therefore, for this mode a look-up table containing expected gray codes is used. The two gray codes for the expected target and the expected target plus and minus one band are stored in the microprocessor RAM 143. A case statement in firmware to search the table of three possible values per burst is implemented. This method also has the advantage of producing relatively fast decode conversions.

Figure 8:
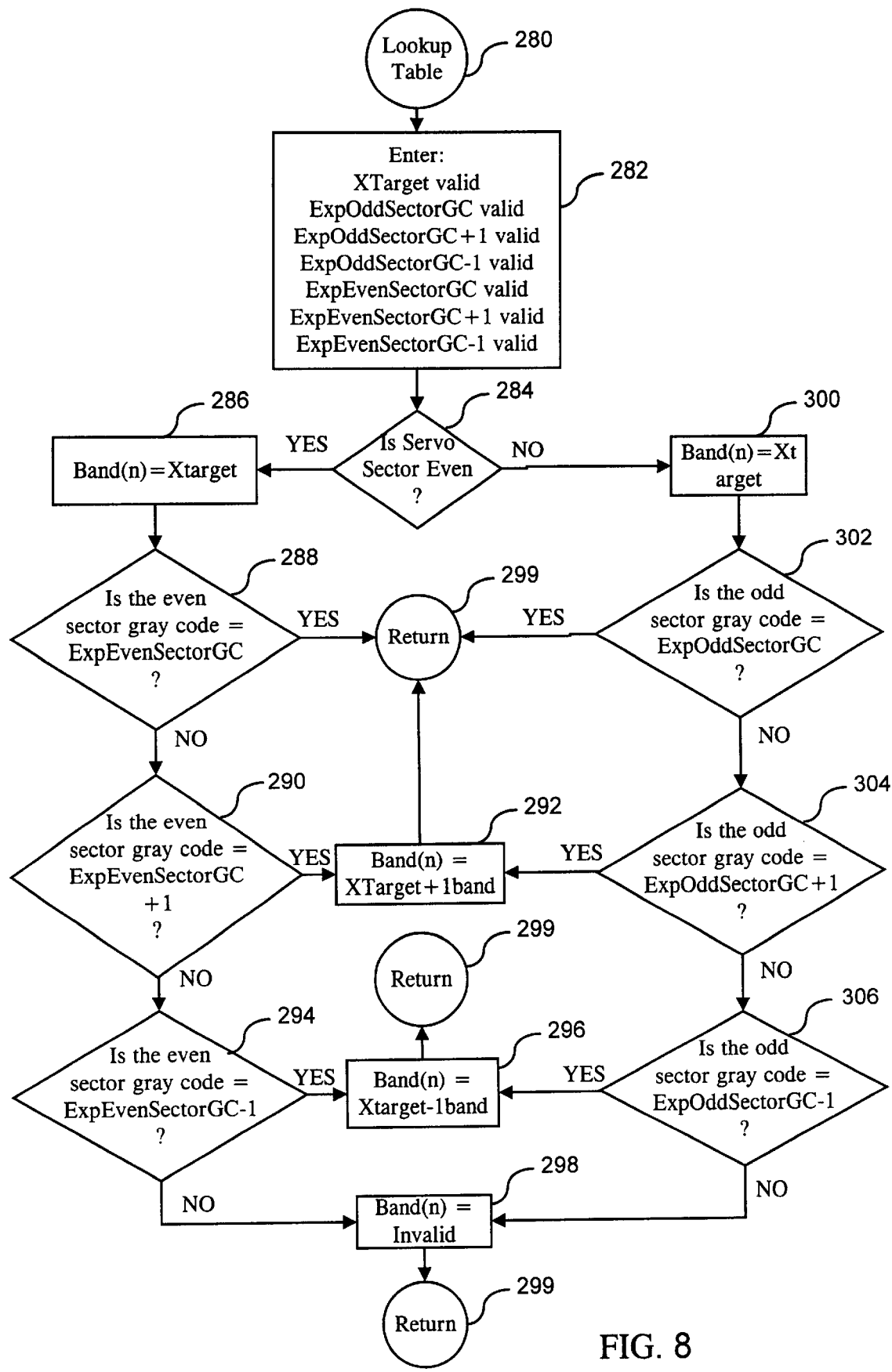
FIG. 8 is a lookup table subroutine operation flow chart for track identification in accordance with a preferred embodiment of the invention.

The Lookup table decode subroutine 280, shown in FIG. 8, begins in operation 282 with the entry of the expected band number (Xtarget). The subroutine then determines and enters the following values from the lookup table:

expected odd sector gray code (ExpOddSectorGC), expected odd sector gray code+1 band (ExpOddSectorGC Plus1), expected odd sector gray code−1 (ExpOddSectorGCMinus1), expected even sector gray code (ExpOddSectorGC), expected even sector gray code+1 band (ExpOddSectorGC Plus1), and expected even sector gray code−1 band (ExpOddSectorGCMinus1).

Control then transfers to query operation 284 where the decoded current servo sector burst is evaluated as even or odd. If the servo sector is even, control transfers to operation 286 where the band is identified as being the expected target band. Control then transfers to query operation 288 where the even sector gray code is compared to the expected even sector gray code. If the decoded gray code is equal to the expected even sector gray code, then control returns via operation 299 to the calling state, indicating that the head is on track and on the expected band.

If the decoded even sector gray code is unequal to the expected even sector gray code then control transfers to operation 290 where the decoded gray code is compared to the expected even sector gray code+1. If the answer is affirmative, then the actual band equals the expected target+1 band and control transfers to operation 292. Control then transfers back to the track follow state 264 with the actual band identified as being the expected target band+1, for repositioning the heads to the expected target band If, in operation 290, the answer is no, control transfers to operation 294 where the query is made whether the even sector gray code is equal to the expected even sector gray code minus 1. If the answer is yes, control transfers to operation 296 where the actual band is set to the expected target−1 band. Control again then returns to state 264. If the answer in operation 294 is no, then the actual band is neither expected or expected plus or minus 1.

Therefore the routine 280 sets an invalid band ID in operation 298 and control then returns to the calling state via operation 299.

If, in operation 284, the servo sector is identified as not even, control transfers to operation 300 where the present band is set equal to the expected target band. Control then transfers to operation 302 where the query is made whether the odd sector gray code equals the expected odd sector gray code. If the answer is yes, control returns via operation 299 to state 264. If the answer is no, then control transfers to operation 304 which asks whether the odd sector gray code is equal to the expected odd sector gray code plus 1. If it is, then control transfers to operation 292 where the band is identified as the expected target plus 1 band. Control then transfers via operation 299 back to the calling state, the track following state 264.

If the answer in operation 304 is no, then control transfers to operation 306 where the query is made whether the odd sector gray code is equal to the expected odd sector gray code minus 1. If the answer is yes, control transfers to operation 296 where the band is identified as being at the expected target minus 1. Control then returns via operation 299 to the calling track following state 264. If the answer is no, control transfers to operation 298 where an invalid band signal is set and returns via operation 299 to the track following state 264, indicating that the present band is not or no longer within one band of the expected band. Control will then transfer out of track following state 264 to track follow settle 252 where the gray zone decode option 310 described in FIG. 9 is implemented.

Figure 9:
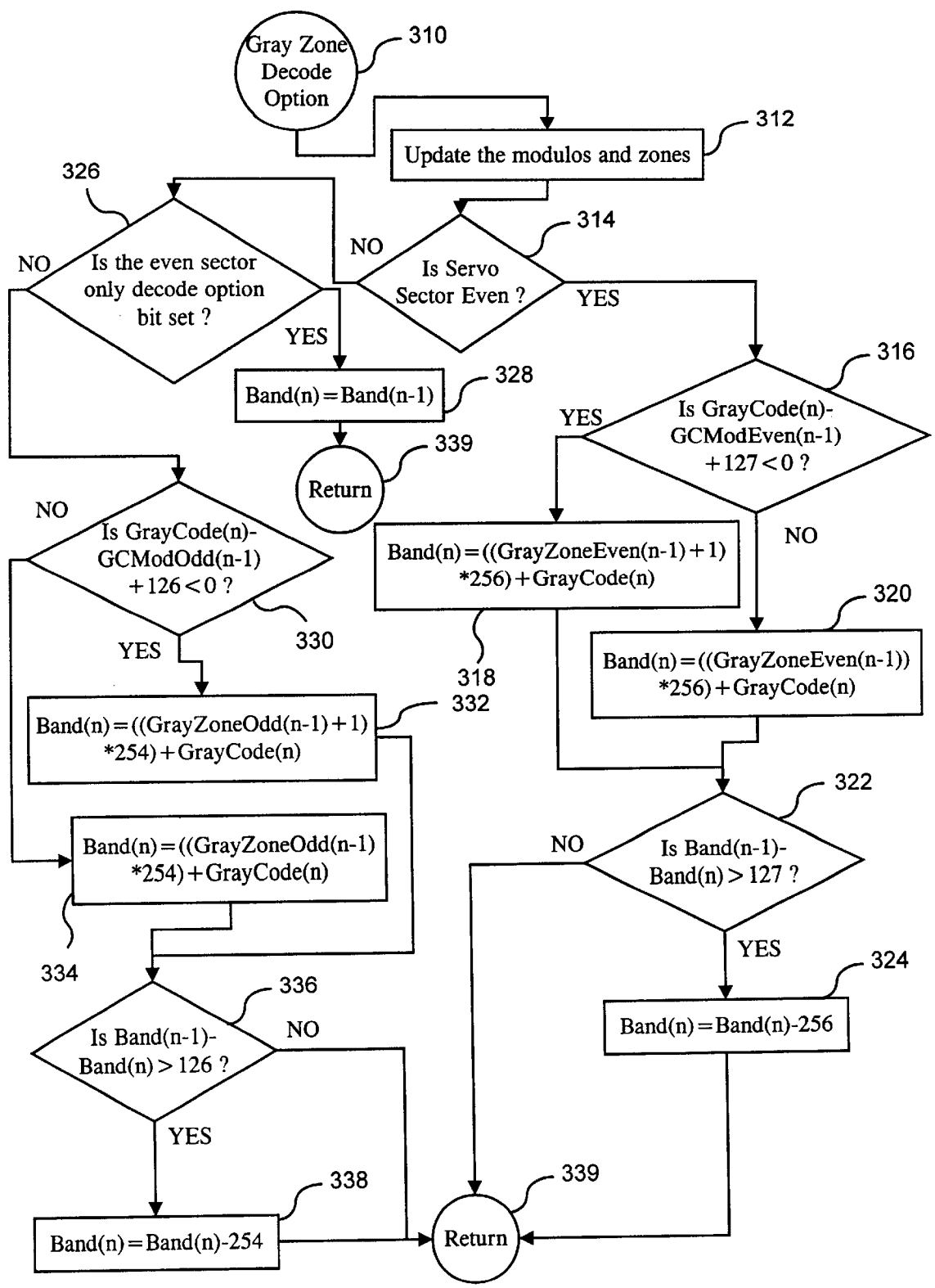
FIG. 9 is a gray zone decoding subroutine operation flow chart in accordance with a preferred embodiment of the invention.

Referring now to FIG. 9, the gray zone decode option 310 is explained. First, the following information is entered:
Band(n−1) valid,
ServoSector(n) valid
GrayCode(n) valid
GCModEven(n−1) valid
GCModOdd(n−1) valid
GrayZoneEven(n−1) valid
GrayZoneOdd(n−1) valid
where:
Band(n−1)=previous servo track(band) number
ServoSector(n)=current burst number
GrayCode(n)=current gray code weight (RLL gray code decoded to decimal value, e.g. 0 number or weight for actual gray code of 1C4)

GCModEven(n−1)=mod(Band(n−1))/256
GCModOdd(n−1)=mod(Band(n−1))/254
GrayZoneEven(n−1)=integer(Bandn−1))/256
GrayZoneOdd(n—1)=integer(Band(n−1))/254

Then the modulos and zones are updated in operation 312. This operation is described in FIG. 11 and is described in more detail further below. When updating is completed in operation 312, control transfers from operation 312 to query 314 which tests whether the sensed current servo sector burst number is even. If the answer is yes, i.e., the sensed servo sector is even, control transfers to query 316 which asks whether the GrayCode(n)−GcModEven(n−1)+127 is less than zero. If the answer to this query is yes, control transfers to operation 318 where the Band(n)= ((GrayZoneEven(n−1)+1)*256)+GrayCode(n). If the answer to this query 316 is no, control transfers to operation 320 where the Band(n)=((GrayZoneEven(n−1)*256)+ GrayCode(n).

After operation 318 or 320, control transfers to query 322 which asks whether Band(n−1)−Band(n) is grater than 127. If so, control transfers to operation 324 where Band(n) is set equal to Band (n)−256 and then returns via operation 339 to the calling state. If not, control returns via operation 339 directly to the calling state.

Back in query 314, if the answer is no, then control shifts to query 326 which asks whether the even sector only decode option bit is set. If this bit is set, control transfers to operation 328 where the Band(n) is set equal to Band(n−1) and then returns to the calling state via operation 339. In other words, the band is the same as the previous band. If, in query 326, the even sector decode option bit is found not set, then control transfers to query 330 which asks whether the GrayCode(n)−GCModOdd(n−1)+126 is less than zero. If yes, then control transfers to operation 332 where Band (n)=((GrayZoneOdd(n−1) +1)*254)+GrayCode(n). If no, then control transfers to operation 334 where Band(n)= ((GrayZoneOdd(n−1)*254)+GrayCode(n). Control transfers from both operation 332 and 334 to query 336 which asks whether Band(n−1)−Band(n) is greater than 126. If yes, control transfers to operation 338 in which Band(n) is set equal to Band(n)−254. Control then returns via operation 339 to the calling state. If the answer to query 336 is no, control returns via operation 339 directly-back to the calling state.

Figure 11:
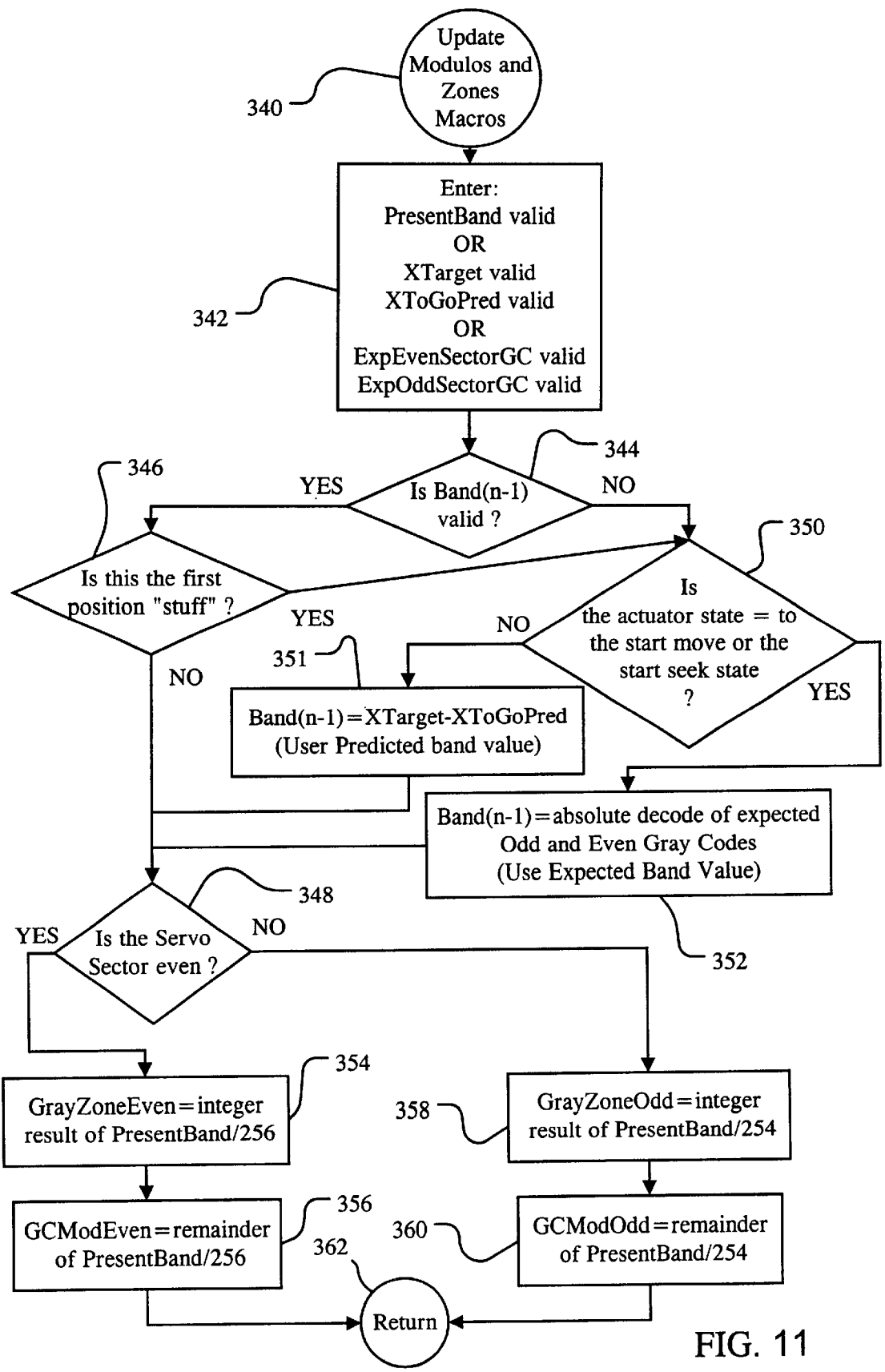
FIG. 11 is an update modulo and zone macro subroutine operation flow chart in accordance with a preferred embodiment of the present invention.

Turning now to FIG. 11, Updating the modulos and zones for modulo gray code decode modes "Gray Zone" and "Gray Zone Crossing" subroutines 310 and 400 respectively begun in operation 340 and is based on knowledge of the "PresentBand" where PresentBand is Band(n−1), i.e., the last known previous band. "Xtarget" is the expected target band number. "ZToGoPred" is the predicted distance to go to reach the target band. "ExpEvenSectorGC" is the expected gray code for even sectors on the target band. "ExpOddSectorGC" is the expected gray code for odd sectors on the target band.

First, PresentBand valid or Xtarget valid and XToGoPred valid, or ExpEvenSectorGC valid and ExpOddSectorGC valid parameters are entered in operation 342. Once one of these sets of parameters is entered, control transfers to query 344 which asks is Band(n−1) valid. If yes, control transfers to query 346 which asks whether or not the control used the estimated, not actual, position for Band(n−1). If not, control transfers to query 348. If the answer in query 346 is yes, control transfers to query 350. Similarly, if the answer to query 344 is no, control also transfers to query 350.

Query 350 asks whether the actuator state is in the start move or the start seek state 270 (see FIG. 6). If the answer is yes, control transfers to operation 352 where Band(n−1) is set equal to the absolute decode of the expected odd and Even Gray Codes, i.e. the expected Band Value from the RAM lookup table. Control then transfers to query 348. If the answer to query 350 is no, control transfers to operation 351 in which Band(n−1) is set equal to Xtarget-XToGoPred (the User Predicted band value obtained from the observer, i.e. an estimate). Control then transfers to query 348 as before.

Query 348 asks whether the previous servo sector (n−1) is even. If the servo sector is even, control transfers to operation 354 which sets the GrayZoneEven=integer result of PresentBand/256. Control then transfers to operation 356 which sets the GCModEven=the remainder of PresentBand/256. If the servo sector is odd in query 348, i.e. the answer to the query is no, control transfers to operation 358 where GrayZoneOdd is set=integer result of PresentBand/254. Control then transfers to operation 360 where GCModOdd=remainder of PresentBand/254. After either operations 356 or 360, control returns via operation 362 to the calling routine, either Gray Zone Decode option 310 or Gray Zone Crossing Decode Option 400.

Figures 1, 10:
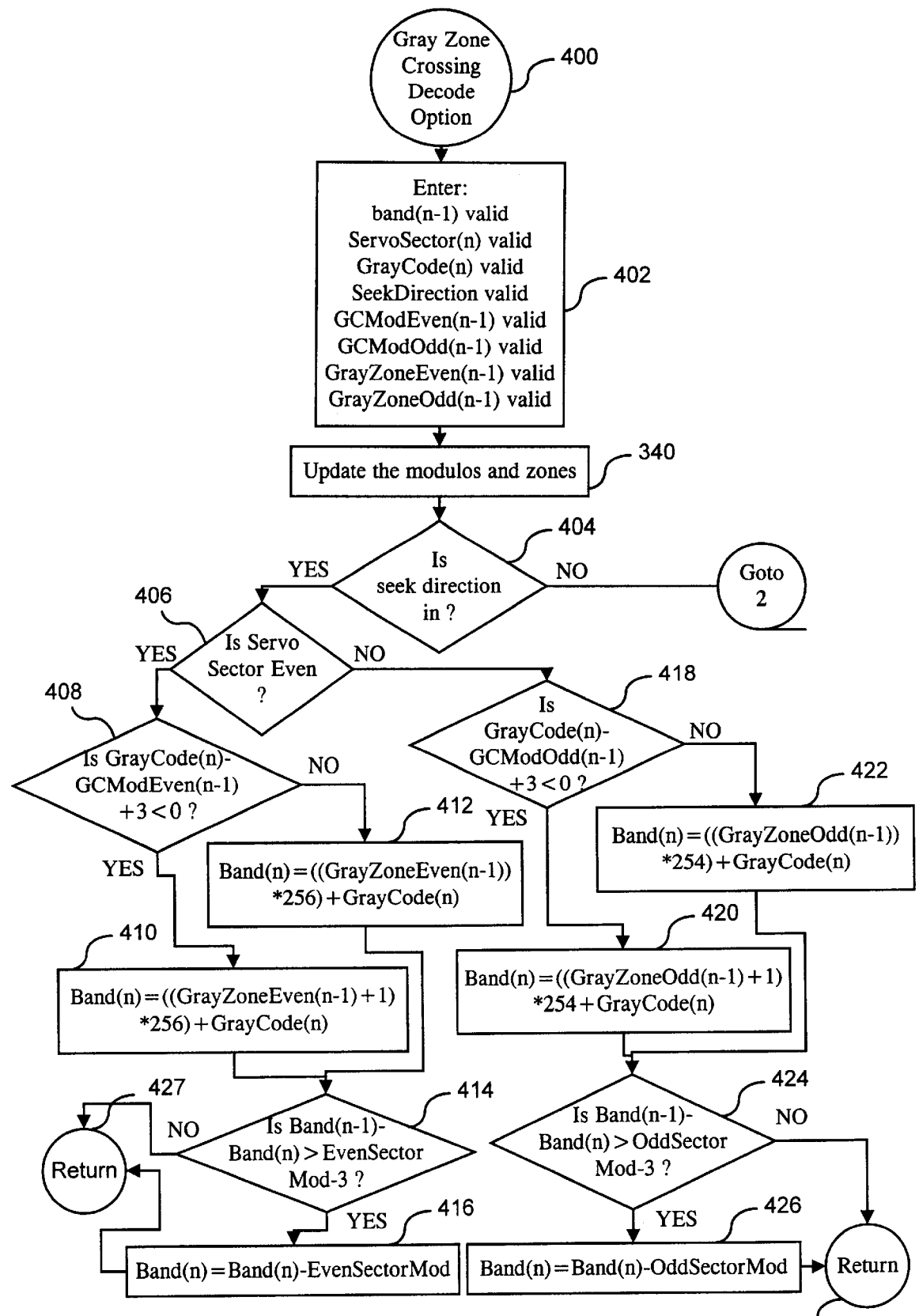
Figures 2, 10:
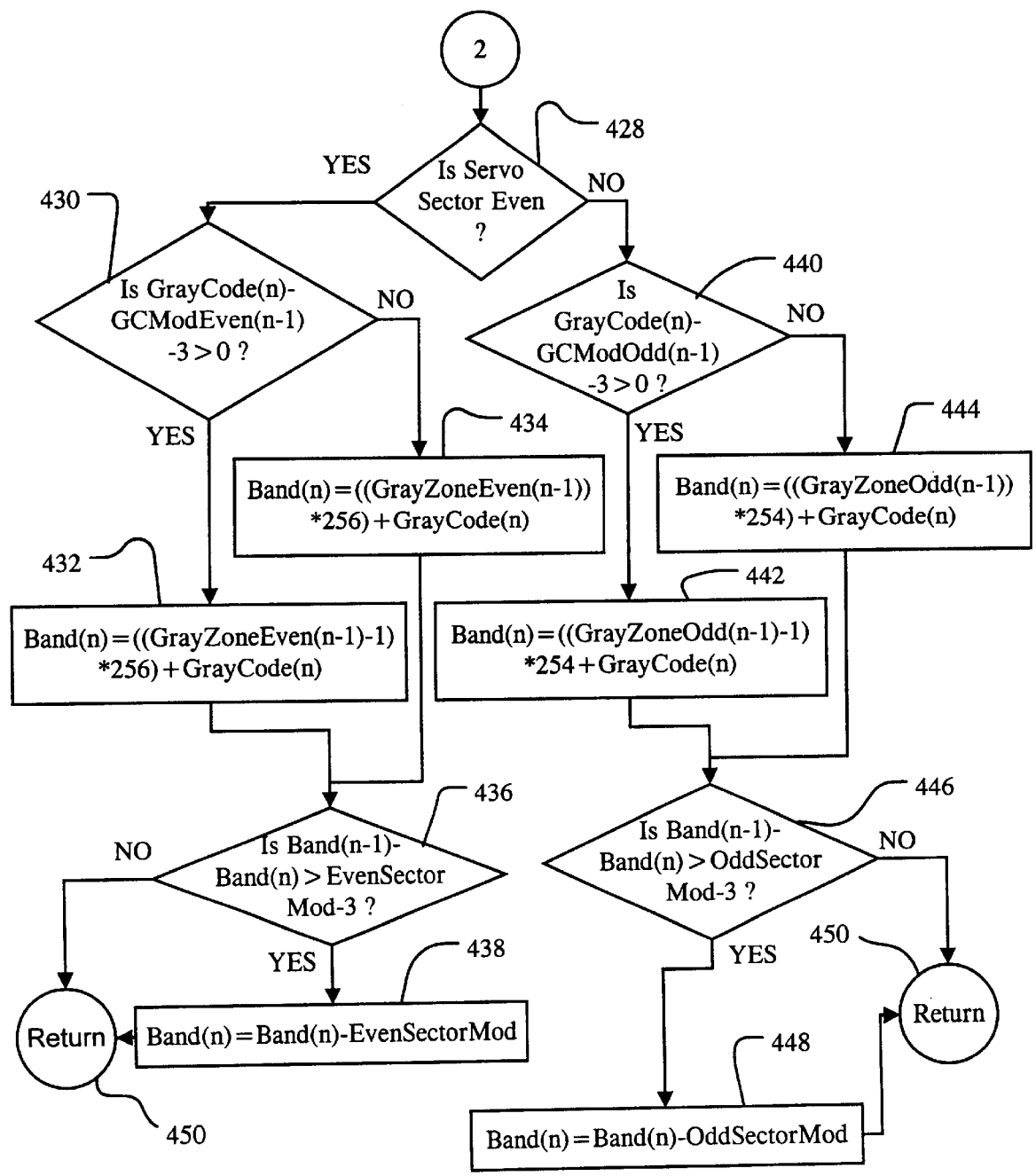

The Gray Zone Crossing decode option is explained with reference to FIGS. 10-1 and 10-2. The Gray Zone Crossing decode option 400 is utilized during velocity mode seeks because the angular velocity of the actuator 110 is too fast for absolute or Gray Zone methods to be used. The algorithm need to know the previous band number, the servo sector odd or even indicator, the seek direction, either in or out, and the decoded gray code value for the present burst. From this information the Gray Zone Crossing is able to determine the current band number provided the velocity is less than the modulo number of bands (i.e.256 or 254). If an invalid gray code was decoded for the previous band number then the estimated band number is "stuffed" in its place and used instead. On the first occurrence of a "stuffed" position measurement, the estimated band number will also be used, unless it occurs during the first two seek initialization states. Then it uses the lookup table in RAM as the expected GC for band(n−1).

The Gray Zone Crossing Decode option 400 begins in operation 402 with the gathering and entry of the following parameters:

Band(n−1) valid
ServoSector(n) valid
GrayCode(n) valid
SeekDirection valid
GCModEven(n−1) valid
GCModOdd(n−1) valid
GrayZoneEven(n−1) valid
GrayZoneOdd(n−1) valid where:

Band(n−1)=previous servo track or band number
ServoSector(n)=current burst number
GrayCode(n)=current gray code weight (RLL gray code decoded to decimal, e.g. 0 number or weight for actual gray code of 1C4)
GCModEven(n−1)=mod(Band(n−1))/256
GCModOdd(n−1) =mod(Band(n−1))/254
GrayZoneEven(n−1)=integer(Band(n−1))/256
GrayZoneOdd(n−1)=integer(Band(n−1))/254

Control then transfers to operation 340, updating the modulos and zones, described with reference to FIG. 11. Following return from operation 340, control transfers to query 404 which asks whether the SeekDirection is "in". If yes, control transfers to query 406 which asks whether the Servo Sector is Even. If the answer in operation 406 is yes, control transfers to query 408 which asks whether the GrayCode(n)-GCModEven(n−1)+3 is less than zero. If the answer is yes, then control transfers to operation 410 where Band(n) is set=((GrayZoneEven(n−1)+1)*256)+GrayCode(n). If the answer in operation 408 is no, then control transfers to operation 412 where Band(n) is set= ((GrayZoneEven(n−1)*256)+GrayCode(n). Control from either operations 410 and 412 then transfers to query 414 which asks whether Band(n−1)-Band(n) is greater than EvenSectorMod−3. IF the answer to this query is no, then control returns via operation 427 to the calling state. If the answer to query 414 is yes, then control transfers to operation 416 which sets Band(n)=Band(n)−EvenSectorMod. Control then returns via operation 427 to the calling state.

Back in query 406, if the answer was no, i.e. the Servo Sector is odd, then control transfers to query 418 which asks whether GrayCode(n)—GCModOdd(n−1)+3 is less than zero. If the answer is yes, control transfers to operation 420 in which Band(n) is set=((GrayZoneOdd(n−1)+1)*254+GrayCode(n). If the answer in query 418 is no, then control transfers to operation 422 in which Band(n) is set= ((GrayZonerOdd(n−1))*254)+GrayCode(n). Control transfers from either operation 420 or 422, upon completion, to query 424 which asks whether Band (n−1)−Band(n) is greater than OddSectorMod−3. If the answer is no, control returns via operation 427 directly to the calling state. If the answer is yes, control transfers to operation 426 where Band(n) is set equal to Band(n)−OddSectorMod. Control then returns via operation 427 to the calling state.

Back in query 404, if the seek direction is out, control transfers to query 428 which asks whether the Servo Sector is Even. If the answer in operation 428 is yes, control transfers to query 430 which asks whether the GrayCode (n)−GCModEven(n−1)−3 is greater than zero. If the answer is yes, then control transfers to operation 432 where Band(n) is set=((GrayZoneEven(n−1)−1)*256)+GrayCode(n). If the answer in operation 430 is no, then control transfers to operation 434 where Band(n) is set=((GrayZoneEven(n−1)*256)+GrayCode(n). Control from either operations 432 or 434 then transfers to query 436 which asks whether Band (n−1)−Band(n) is greater than EvenSectorMod−3. If the answer to this query is no, then control returns via operation 450 to the calling state. If the answer to query 436 is yes, then control transfers to operation 438 which sets Band(n)=Band(n)−EvenSectorMod. Control then returns via operation 450 to the calling state.

Back in query 428, if the answer was no, i.e. the Servo Sector is odd, then control transfers to query 440 which asks whether GrayCode(n)−GCModOdd(n−1)−3 is greater than zero. If the answer is yes, control transfers to operation 442 in which Band(n) is set=((GrayZoneOdd(n−1)−1)*254+GrayCode(n). If the answer in query 440 is no, then control transfers to operation 444 in which Band(n) is set= ((GrayZoneOdd(n−1))*254)+GrayCode(n). Control transfers from either operation 442 or 444, upon completion, to query 446 which asks whether Band (n−1)−Band(n) is greater than OddSectorMod−3. If the answer is no, control returns via operation 450 directly to the calling state. If the answer is yes, control transfers to operation 448 where Band(n) is set equal to Band(n)−OddSectorMod. Control then returns via operation 450 to the calling state.

Thus the method of reducing a servo burst length recorded on each of sequentially numbered radial servo sectors spaced around a disc having concentric magnetic information storage tracks thereon, each having a unique sequential track identification number, in accordance with the invention involves separating the sectors into sets of sectors (such as in operations 500 and 502 and modulo encoding each set of sectors with a modulo operation of the track identification number (such as in operations 504, 506, 510 and 512) each using a unique modulus. More preferably, the method includes separating the sectors into at least a first set of sectors and at least a second set of sectors (such as in operations 500 and 502. The first set of sectors on each track is then subjected to a modulo operation (such as in operation 504) of the track identification number (such as 176) using a first modulus and the second set of sectors (such as in operation 510) on each track is subjected to a modulo operation of the track identification number using a second modulus different from the first modulus. The modulo numbers are then converted to Gray code and written to the disc.

Still more preferably, the sectors are divided into even numbered sectors and odd numbered sectors (such as in operations 500 and 502). The even numbered sectors (such as 170) on each track (such as 164, 182) are then subjected to a first modulo operation of the track identification number (such as 176) for the track using a first modulus (such as in operation 504), and the odd numbered sectors (such as 170) on each track (such as 164, 182) are subjected to a second modulo operation (such as in operation 510) of the track identification number (such as 176) for the track using a second modulus. The modulo numbers thus determined are then converted to a Gray code value (such as in operations 506 and 512). Finally, the encoded sector numbers are written to the disc as part of the servo burst in the servo writing process.

In this exemplary embodiment of the concept, the second modulus is preferably less than the first modulus. Further, the first modulus is preferably 256. The second modulus is preferably 254. Further, the sectors are preferably encoded by a 9 bit gray code with rll limits of 0=3 and 1=4. The encode gray code also preferably incorporates a hamming distance of 1. The sum of the even numbered servo sector modulo number and the odd numbered servo sector modulo number for each track is an even number.

The invention is preferably incorporated into a disc drive apparatus (such as 100) having a plurality of stacked discs (such as 108) on a spindle motor (such as 106), each of the discs (such as 108) having a magnetic media on at least one surface thereof, an actuator (such as 110) supporting a plurality of heads (such as 118) for writing information to and reading information from concentric tracks (such as 164, 182) of the magnetic media on the discs. Each track (such as 164, 182) has a unique sequential track identification number. An actuator motor (such as 124) is attached to the actuator for selectively positioning the heads (such as 118) over selected locations on the magnetic media. The apparatus (such as 100) includes at least one disc(such as 108) having a plurality of sequentially numbered radial servo sectors (such as 170) spaced around the disc (such as 108).

Even numbered sectors (such as 170) on each track (such as 164, 182) are modulo encoded with a first modulo operation of the track identification number for the track using a first modulus. Odd numbered sectors (such as 170) on each track (such as 164, 182) are modulo encoded with a second modulo operation of the track identification number for the track using a second modulus. The second modulus is preferably less than the first modulus. The first modulus is further preferably 256. The second modulus is preferably 254. The sectors (such as 170) are encoded by a 9 bit gray code with rll limits of 0=3 and 1=4. The encode gray code incorporates a hamming distance of 1. Developed in this way, the sum of the even numbered sector modulo number and the odd numbered servo sector modulo number for each track is an even number.

The invention is exemplified by a disc (such as 108) having a magnetic media on at least one surface thereof in which a plurality of radial servo sectors (such as 170) are identified on the media. The sectors are sequentially numbered and spaced around the disc. The disc also has a plurality of concentric tracks (such as 164, 182) identified on the media each having a unique sequential track identification number. The sectors are grouped into a plurality of sets of sectors and each sector is modulo encoded with a modulo operation of the track identification number for the track using a unique modulus for each set. More preferably, even numbered sectors on each track are modulo encoded with a first modulo operation of the track identification number for the track using a first modulus. The odd numbered sectors on each track are modulo encoded with a second modulo operation of the track identification number for the track using a second modulus. The second modulus is preferably less than the first modulus. The first modulus is 256 and the second modulus is 254.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art For example, the sectors around the disc could be subdivided into any number of sets and a separate modulo operation could be applied to the sectors in each set of sectors. The exemplary embodiment described above is simply a two set scheme, hence the term "dual" modulo encoding has been used. Accordingly, all such modifications, changes and alternatives are encompassed in the spirit of the invention disclosed and as defined in the appended claims.

What is claimed is:

1. A method of reducing a servo burst length recorded on each of several sequentially numbered radial servo sectors spaced around a disc having concentric information storage tracks thereon, each having a unique sequential track identification number, the method comprising steps of:
   (a) encoding a first set of sectors on each track with a first modulo operation of the track identification number for the track using a first modulus; and
   (b) encoding a second set of sectors on each track with a second modulo operation of the track identification number for the track using a second modulus different from the first modulus.

2. The method according to claim 1 further comprising the steps of:
   (c) converting the modulo encoded sets of sectors to Gray code values; and
   (d) writing the Gray code values to the disc.

3. The method according to claim 1 wherein the modulo encoding step (a) comprises the steps:
   (a)(i) selecting sequential even numbered sectors; and
   (a)(ii) modulo encoding the even numbered sectors with the first modulus to produce an even modulo track identification (ID) number.

4. The method according to claim 3 wherein the modulo encoding step (b) comprises the steps of:
   (b)(i) selecting sequential odd numbered sectors; and
   (b)(ii) modulo encoding the odd numbered sectors with the second modulus to produce an odd modulo track ID number.

5. The method according to claim 4 wherein the first modulus is 256 and the second modulus is 254.

6. The method according to claim 3 further comprising a step of:

(c) converting the modulo track ID number to Gray code.

7. The method according to claim 3 wherein the encode gray code is operationally configured to have a hamming distance of 1.

8. The method according to claim 5 wherein the sum of an even numbered sector modulo track identification (ID) number and an odd numbered servo sector modulo track ID number for each track is an even number.

9. A disc drive having a plurality of stacked discs on a spindle motor, each of said discs having an information storage media on a surface thereof, the media having concentric tracks defined thereon, each track having a unique sequential track identification number, the drive comprising:

(a) tracks of the discs having a plurality of sequentially numbered radially aligned servo sectors spaced around the disc;

(b) a first set of sectors on each track each including a track identification (ID) number modulo encoded with a first modulo operation of the track identification number for the track using a first modulus; and (c) a second set of sectors on each track each being modulo encoded with a second modulo operation of the track identification number for the track using a second modulus different from the first modulus.

10. The drive according to claim 9 wherein the first set of sectors is made of even numbered sectors and the second set of sectors is made of odd numbered sectors.

11. The drive according to claim 9 wherein the second modulus is less than the first modulus.

12. The drive according to claim 9 wherein the first modulus is 256 and the second modulus is 254.

13. The drive according to claim 11 wherein the encode gray code is operatively configured to have a hamming distance of 1.

14. The drive according to claim 12 wherein the sum of an even numbered servo sector modulo number and an odd numbered servo sector modulo number for each track is an even number.

15. A disc having a magnetic media on at least one surface thereof, the disc comprising:

a plurality of radial servo sectors identified on the media, the sectors being sequentially numbered and spaced around the disc; and a plurality of concentric tracks on the media each having a unique sequential track identification number, wherein a first set of sectors on each track is modulo encoded with a first modulo operation of the track identification number for the track using a first modulus, and at least a second set of sectors on each track is modulo encoded with a second modulo operation of the track identification number for the track using a second modulus different from the first modulus.

16. The disc according to claim 15 wherein the first set of sectors is made of even numbered sectors and the second set of sectors is made of odd numbered sectors.

17. The disc according to claim 15 wherein the first modulus is 256 and the second modulus is 254.

18. A disc drive operable with a disc, the drive comprising:

an information storage media on at least one surface of the disc having concentric tracks defined on the media and radial aligned servo burst sectors in adjacent tracks; and means for uniquely identifying a track on the media from at least two differently modulo encoded servo burst sectors on the track.

* * * * *